(12) United States Patent
Wu

(10) Patent No.: US 9,341,542 B2
(45) Date of Patent: May 17, 2016

(54) FIBER OPTIC INSPECTION APPARATUS

(71) Applicant: APACK AUTOMATION CORPORATION, New Taipei (TW)

(72) Inventor: Chun-Chang Wu, New Taipei (TW)

(73) Assignee: APACK AUTOMATION CORPORATION, New Taipei (TW)

( * ) Notice: Subject to any disclaimer, the term of this patent is extended or adjusted under 35 U.S.C. 154(b) by 95 days.

(21) Appl. No.: 14/309,903

(22) Filed: Jun. 20, 2014

(65) Prior Publication Data

US 2015/0168252 A1 Jun. 18, 2015

(30) Foreign Application Priority Data

Dec. 13, 2013 (TW) .............................. 102223588 U

(51) Int. Cl.
*G01M 11/00* (2006.01)
*G02B 6/00* (2006.01)

(52) U.S. Cl.
CPC . *G01M 11/30* (2013.01); *G02B 6/00* (2013.01)

(58) Field of Classification Search
None
See application file for complete search history.

(56) References Cited

U.S. PATENT DOCUMENTS

| 5,196,899 A * | 3/1993 | Serwatka | G01M 11/30 356/73.1 |
| 5,731,893 A * | 3/1998 | Dominique | G02B 6/3807 359/379 |
| 6,215,555 B1 * | 4/2001 | Chivers | G02B 6/3833 356/511 |
| 6,705,767 B1 * | 3/2004 | Dean, Jr. | G01B 9/02 356/477 |
| 6,773,276 B2 * | 8/2004 | Ziegler | H01R 13/635 439/131 |
| 7,004,639 B2 * | 2/2006 | Norland | G02B 6/3807 356/73.1 |
| 7,373,069 B2 * | 5/2008 | Lazo | G01M 11/30 385/134 |
| 8,208,134 B1 * | 6/2012 | Gunal | G01M 11/088 356/73.1 |
| 9,151,694 B2 * | 10/2015 | Wilson | B08B 1/00 |

* cited by examiner

*Primary Examiner* — Gordon J Stock, Jr.
(74) *Attorney, Agent, or Firm* — Leong C. Lei

(57) ABSTRACT

A fiber optic inspection apparatus includes a male connector with a protruding pin or a female connector with a plug hole, a casing, an inspection means, a first control unit and a second control unit. The casing has an accommodating space for installing the inspection means, first control unit and second control unit, and a connecting hole. The inspection means has a connecting end and a pair of moving guide pins, and the connecting end has two through holes for passing the moving guide pins and switching the status of protruding from or being received in the through holes. The first control unit is for fixing the inspection means and coupling the moving guide pins, and a control button is extended from the second control unit and has a side linked with the first control unit for switching the position of the two moving guide pins.

6 Claims, 5 Drawing Sheets

1

FIBER OPTIC INSPECTION APPARATUS

CROSS-REFERENCE TO RELATED APPLICATIONS

This non-provisional application claims priority under 35 U.S.C. §119(a) on Patent Application No(s). 102223588 filed in Taiwan, R.O.C. on Dec. 13, 2013, the entire contents of which are hereby incorporated by reference.

BACKGROUND OF THE INVENTION

1. Field of the Invention

The present invention relates to a mechanical design of a fiber optic cable inspection, and more particularly to a fiber optic inspection apparatus capable of switching on its own according to the types of male and female connectors of a fiber optic circuit.

2. Description of the Related Art

At present, optical fiber is used extensively as a communication transmission medium, which is made of glass or plastic fibers for transmitting light waves, and the optical fiber has a very small diameter and is usually packaged in a plastic protective cover, so that the optical fiber can be bent but not broken easily. Compared with the conventional electric cable, the fiber optic circuit has the advantages of high bandwidth, high communication capacity, long transmission distance and light weight, so that the fiber optic circuits are generally installed in different places to serve as a network transmission medium.

However, it is difficult to determine whether or not each optical fiber is good and operable in the process of installing new fiber optic circuits or replacing old fiber optic circuits, so that the inspection of fiber optic circuit requires various types of fiber optic inspection means to learn the current light guide effect of the optical fibers. In general, connectors of the fiber optic cable are divided into various types including FC, SC, LC, MPO, MTRJ or MTP connectors, and the connectors at both ends of the fiber optic cable may be a connector of a mixed design of the aforementioned types, wherein the MPO and MTP connectors can be divided into a male connector having a protruding pin and a female connector having a connecting hole, and these fiber optic cables are plugged into the fiber optic inspection apparatus one by one for detecting the conducting condition of the fiber optic cable in an inspection. In general, a conventional fiber optic inspection apparatus comes with the male connector, so that it can be used for testing the fiber optic cable having the female connector. For the inspection of the fiber optic cable having the male connector, it is necessary to use other methods to connect the testing fiber optic cable from an outer side of the fiber optic inspection apparatus, since the type of the connector of the conventional fiber optic inspection apparatus is fixed and cannot be removed or replaced. Such inspection apparatus not just lowers the working efficiency and increases additional costs only, but also affects the accuracy of determination in the inspection process, due to a series of connections that may reduce the transmission power of the optical fibers.

Therefore, the inventor of the present invention designed and developed a fiber optic inspection apparatus that can be used universally in various different fiber optic circuits and changed according to the types of male connectors and female connectors to overcome the aforementioned drawbacks of the conventional fiber optic inspection.

SUMMARY OF THE INVENTION

It is a primary objective of the present invention to provide a fiber optic inspection apparatus for inspecting the conducting condition of various types of fiber optic circuits, and the fiber optic inspection apparatus can be switched freely according to the type of connectors of the fiber optic circuit to waive the step of changing the lines of the inspection apparatus one by one or adding adopters of the inspection apparatus to waive the steps of changing the lines or adding of the inspection apparatus to accelerate the inspection speed and improve the inspection efficiency effectively.

To achieve the aforementioned and other objectives, the present invention provides a fiber optic inspection apparatus for inspecting a transmission status of a fiber optic circuit, and the fiber optic circuit having at least one connector, which is a male connector with a protruding pin or a female connector with a plug hole, comprising: a casing, having an accommodating space, and a connecting hole formed on a side of the casing for plugging in the fiber optic circuit; an inspection means, installed in the accommodating space, and having a connecting end and a pair of moving guide pins, and the connecting end being installed at a position corresponding to the connecting hole and coupled to the fiber optic circuit for an inspection, and the connecting end having a pair of through holes corresponding to the pair of moving guide pins respectively for passing the pair of moving guide pins therein, and protruding the pair of moving guide pins out of the pair of through holes or receiving the pair of moving guide pins into the pair of through holes, so that the connecting end fits a change of the connector; a first control unit, installed in the accommodating space, for fixing the inspection means, and connecting the pair of moving guide pins; and at least one second control unit, installed in the accommodating space, and having a control button installed at and extended from a side of the second control unit, and the control button being disposed on an outer side of the casing, and a side of the second control unit having the control button being linked with the first control unit, wherein when a user controls the control button, the second control unit acts correspondingly and drives the first control unit at the same time, so that the pair of moving guide pins are moved and engaged with the fiber optic circuit to conduct an inspection.

Wherein, the first control unit includes a fixing seat and a moving seat, and the fixing seat is installed at a position corresponding to the connecting hole for fixing the connecting end, and a pair of protruding columns are extended from a side of the first control unit, and the moving seat is disposed on a side of the fixing seat and has a pair of penetrating holes for passing the pair of protruding columns, and the moving seat is coupled to the pair of moving guide pins, so that the moving seat drives the pair of moving guide pins while moving along the pair of protruding columns, and the fixing seat has an installation slot concavely formed thereon for fixing the inspection means.

The second control unit includes a first guide block, a second guide block and a gear, and the first guide block is coupled to a side of the control button and has a first engaging portion disposed on a side corresponding to the gear, and the second guide block is coupled to the moving seat and has a second engaging portion disposed on a side corresponding to the gear, and the first guide block and the second guide block are disposed opposite to each other, and the gear is installed between the first guide block and the second guide block and engaged with the first engaging portion and the second engaging portion respectively, and the control button is pushed to drive the first guide block and link the gear and the second guide block, so s to drive the moving seat to move the pair of moving guide pins.

In addition, the control button is a slider, and the casing has a slide slot formed at a position corresponding to the control button and provided for a user to push and move the control button.

DETAILED DESCRIPTION OF THE PREFERRED EMBODIMENTS

Figure 1:
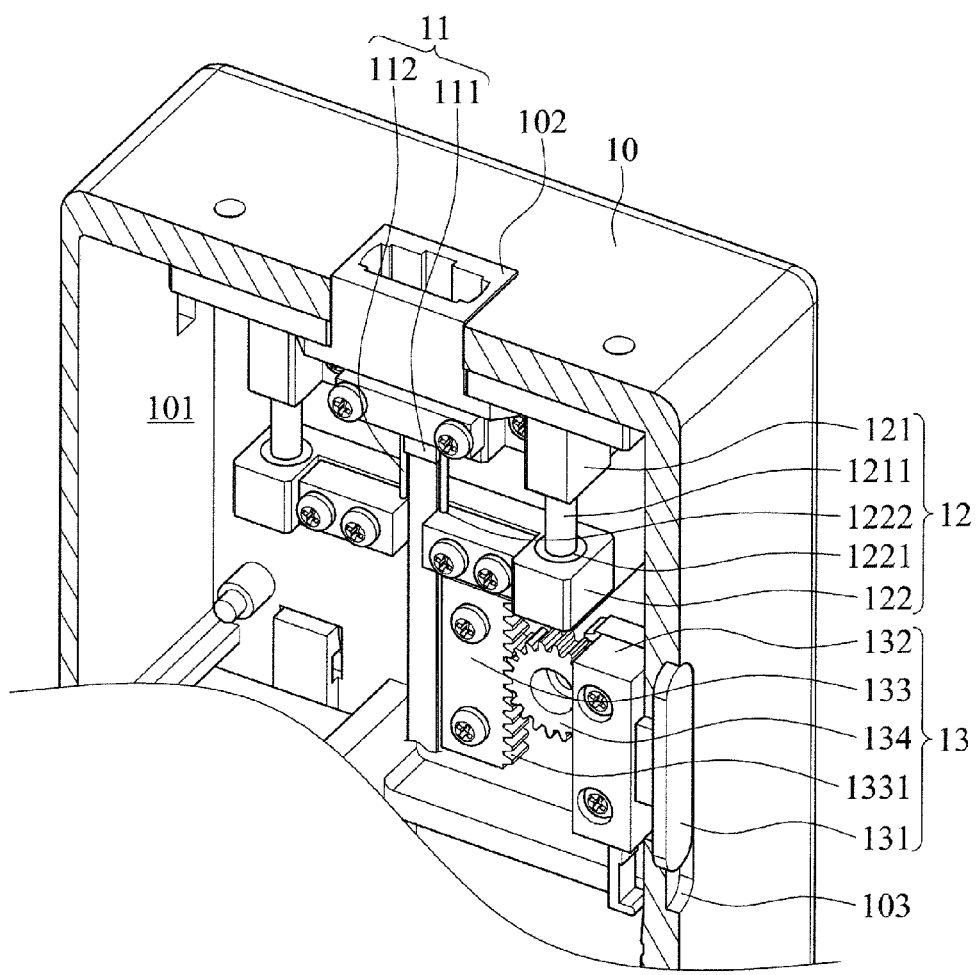
FIG. 1 is a perspective view of a preferred embodiment of the present invention.
Figure 2:
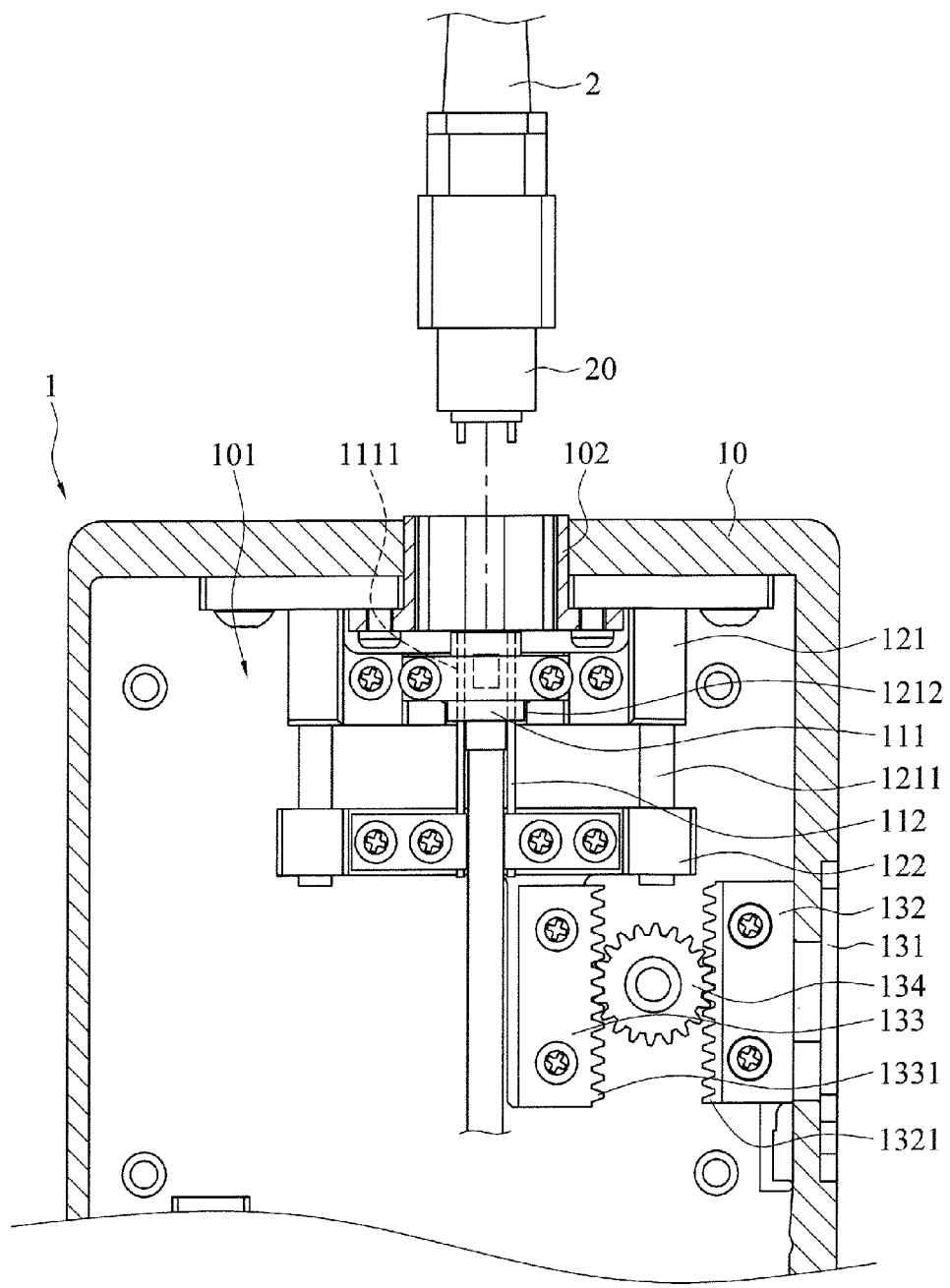
FIG. 2 is a schematic view of a first application of a preferred embodiment of the present invention.

The technical content of the present invention will become apparent with the detailed description of preferred embodiments and the illustration of related drawings as follows.

With reference to FIGS. 1 and 2 to 5 for a perspective view of a fiber optic inspection apparatus in accordance with a preferred embodiment of the present invention and schematic views of various applications of the fiber optic inspection apparatus of the present invention respectively, the fiber optic inspection apparatus 1 is provided for inspecting a transmission status of a fiber optic circuit 2, and the fiber optic circuit 2 includes at least one connector 20, and the connector may be a male connector having a protruding pin or a female connector having a plug hole, wherein the fiber optic circuit 2 can be of the type of MPO or MTP. The fiber optic inspection apparatus 1 comprises a casing 10, an inspection means 11, a first control unit 12 and a second control unit 13.

The casing 10 has an accommodating space 101, and a connecting hole 102 formed on a side of the casing 10 for plugging in the fiber optic circuit 2 and coupled to the inspection means 11 for detecting the status of the testing fiber optic circuit 2.

The inspection means 11 is installed in the accommodating space 101 and has a connecting end 111 and a pair of moving guide pins 112, and the connecting end 111 is disposed at a position corresponding to the connecting hole 102, so that the fiber optic circuit 2 can be coupled to the connecting end 111 through the connecting hole 102 for conducting an inspection, and the connecting end 111 has a pair of through holes 1111 corresponding to the pair of moving guide pins 112 for passing the pair of moving guide pins 112 therein, and the pair of moving guide pins 112 can be protruded along the pair of through holes 1111 and through a surface of the connecting end 111 or received into the pair of through holes 1111, so that the connecting end 111 can accommodate to the change of the connector 20, and if the connector 20 is a male connector having a protruding pin, the pair of moving guide pins 112 can be switched to the status of being received into the pair of through holes 1111. On the other hand, if the connector 20 is a female connector having a plug hole, the pair of moving guide pins 112 can be switched to the status of protruding out from the connecting end 111, so as to achieve the capability of inspecting the fiber optic circuit 2 of both male connector and female connector at the same time. Wherein, the inspection means 11 is also a fiber optic circuit and has a light emitting source (not shown in the figure) at an end of the inspection means 11, so that light can be emitted to the inspection means 11 and the fiber optic circuit 2 coupled to the inspection means 11 during the inspection, and after the testing fiber optic circuit 2 is connected, and the electric conduction condition is observed to determine whether or not the fiber optic circuit 2 is in a normal operating condition.

The first control unit 12 is installed in the accommodating space 101 for fixing the inspection means 11 and connecting the pair of moving guide pins 112, wherein the first control unit 12 is secured into the accommodating space 101 by screws and includes a fixing seat 121 and a moving seat 122, and the fixing seat 121 is disposed at a position corresponding to the connecting hole 102 for fixing the connecting end 111, and a pair of protruding columns 1211 are extended from a side of the fixing seat 121, and an installation slot 1212 is concavely formed on the fixing seat 121 for fixing the connecting end 111 of the inspection means 11. The moving seat 122 is disposed on a side of the fixing seat 121 and has a pair of penetrating holes 1221 for passing the pair of protruding columns 1211 therein, and the moving seat 122 is coupled to the pair of moving guide pins 112 and has a pair of fixing holes 1222 corresponding to the pair of moving guide pins 112, and ends of the pair of moving guide pins 112 are fixed into the pair of fixing holes 1222 respectively, so that when the moving seat 122 is moved along the pair of protruding columns 1211, the pair of moving guide pins 112 are driven.

The second control unit 13 is also installed in the accommodating space 101 and has a control button 131 extended from a side of the second control unit 13, and the control button 131 is disposed on an outer side of the casing 10. Preferably, the control button 131 is a slider, and the casing 10 has a slide slot 103 corresponding to the control button to facilitate the user to control, operate and move the control button 131. A side of the second control unit 13 opposite to the side having the control button 131 is linked to the first control unit 12, wherein the second control unit 13 includes a first guide block 132, a second guide block 133 and a gear 134. And the first guide block 132 is disposed on a side of the control button 131 and has a first engaging portion 1321 disposed on a side corresponding to the gear 134, and the second guide block 133 is coupled to the moving seat 122 and has a second engaging portion 1331 disposed on a side corresponding to the gear 134, and the first guide block 132 and the second guide block 133 are arranged opposite to each other, and the gear 134 is installed between the first guide block 132 and the second guide block 133 and latched to the first engaging portion 1321 and the second engaging portion 1331 respectively. When the control button 131 is pushed to move the first guide block 132, the gear 134 is driven by the first engaging portion 1321 while the second engaging portion 1331 moves the second guide block 133. Since the first guide block 132 and the second guide block 133 are disposed opposite to each other, therefore the first guide block 132 and the second guide block 133 will move in opposite directions with respect to each other. When the user controls and operates the control button 131, the second control unit 13 operates correspondingly and drives the first control unit 12 at the same time, so that the pair of moving guide pins 112 are moved to engage with the testing fiber optic circuit 2 in order to conduct an inspection. In addition, there may be plural second control units 13, so that users may control and operate can the control button 131 of the casing 10 from different direction to improve the convenience of conducting the inspection.

Figure 3:
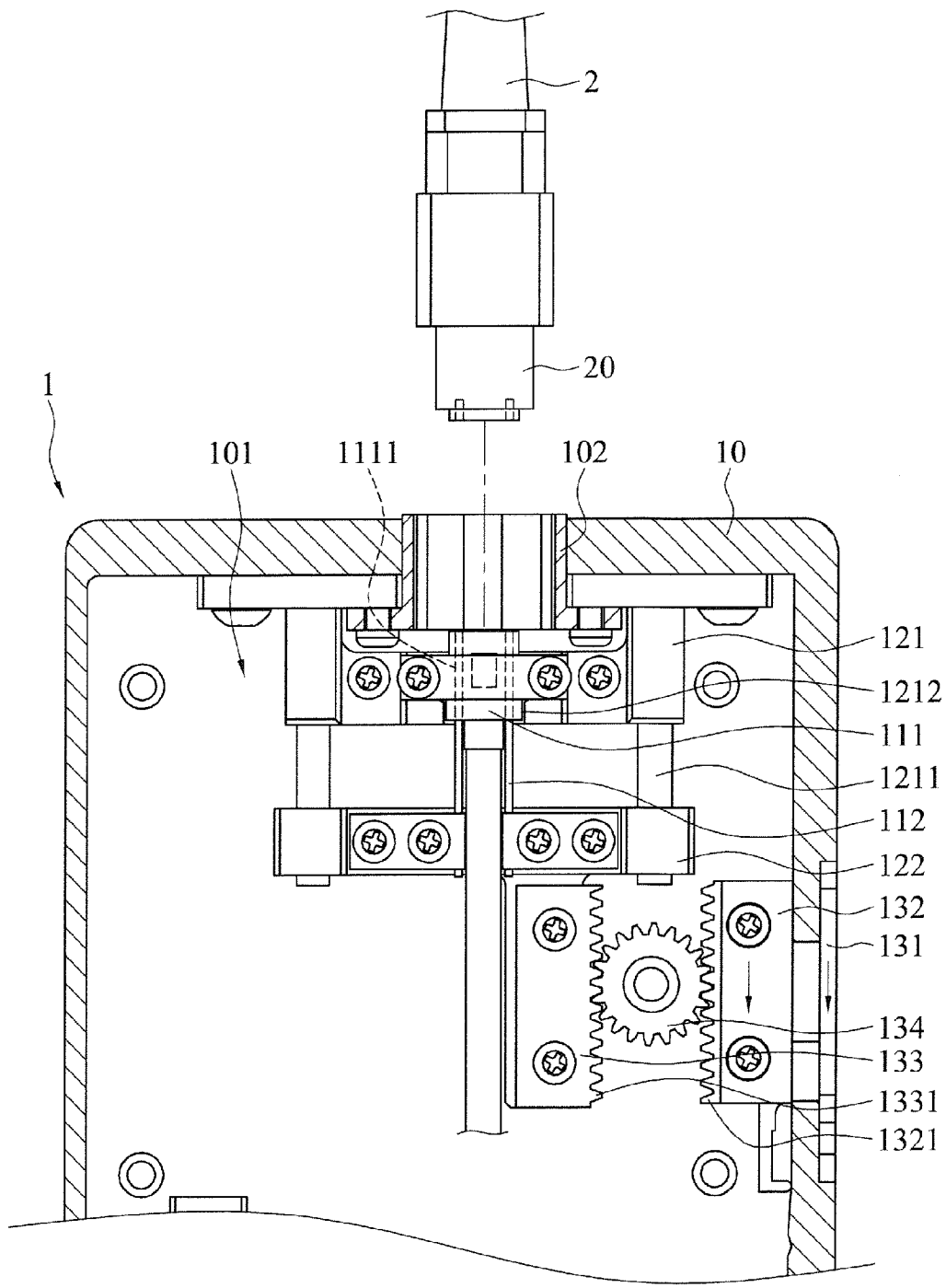
FIG. 3 is a schematic view of a second application of a preferred embodiment of the present invention.
Figure 4:
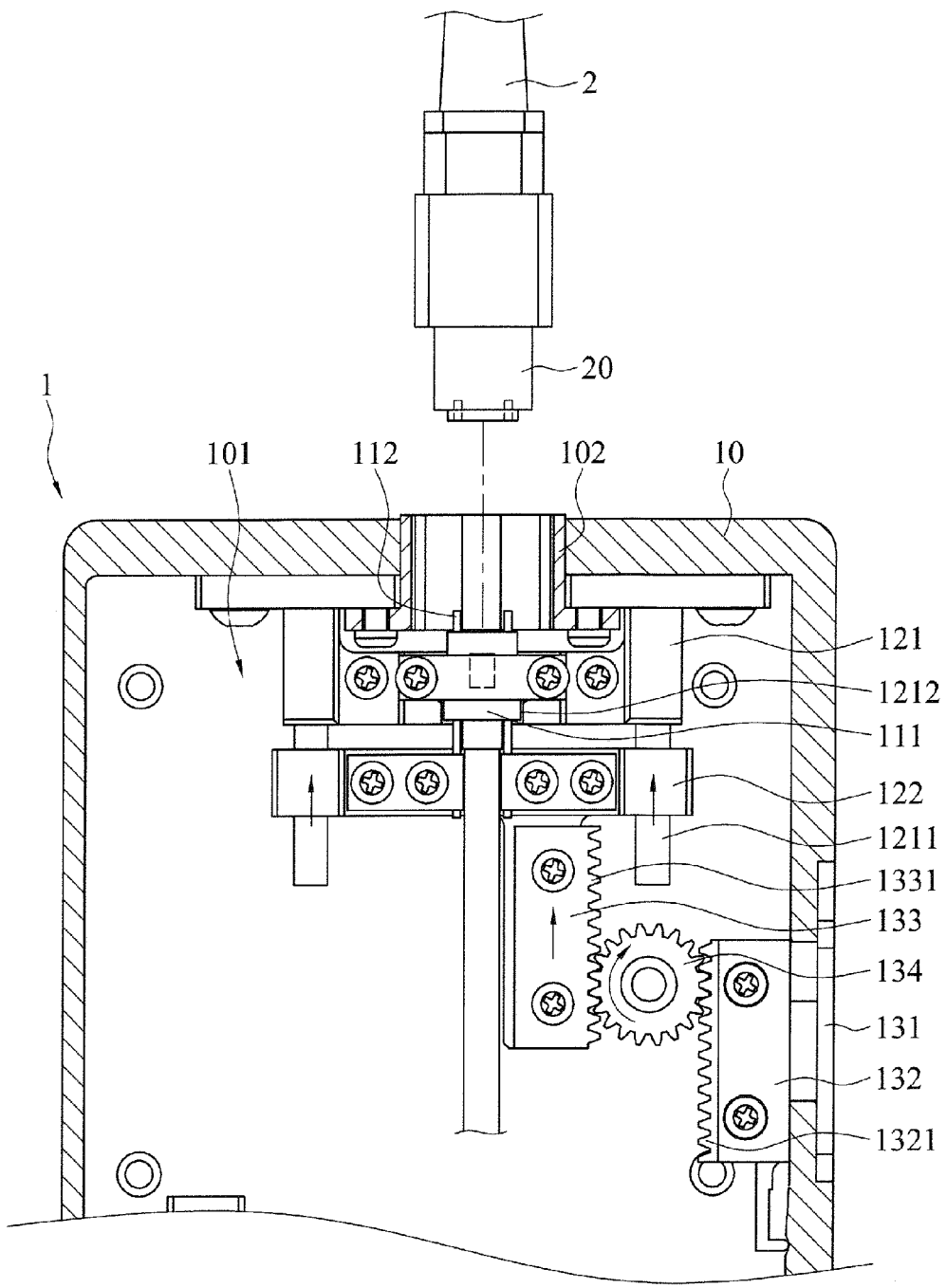
FIG. 4 is a schematic view of a third application of a preferred embodiment of the present invention.
Figure 5:
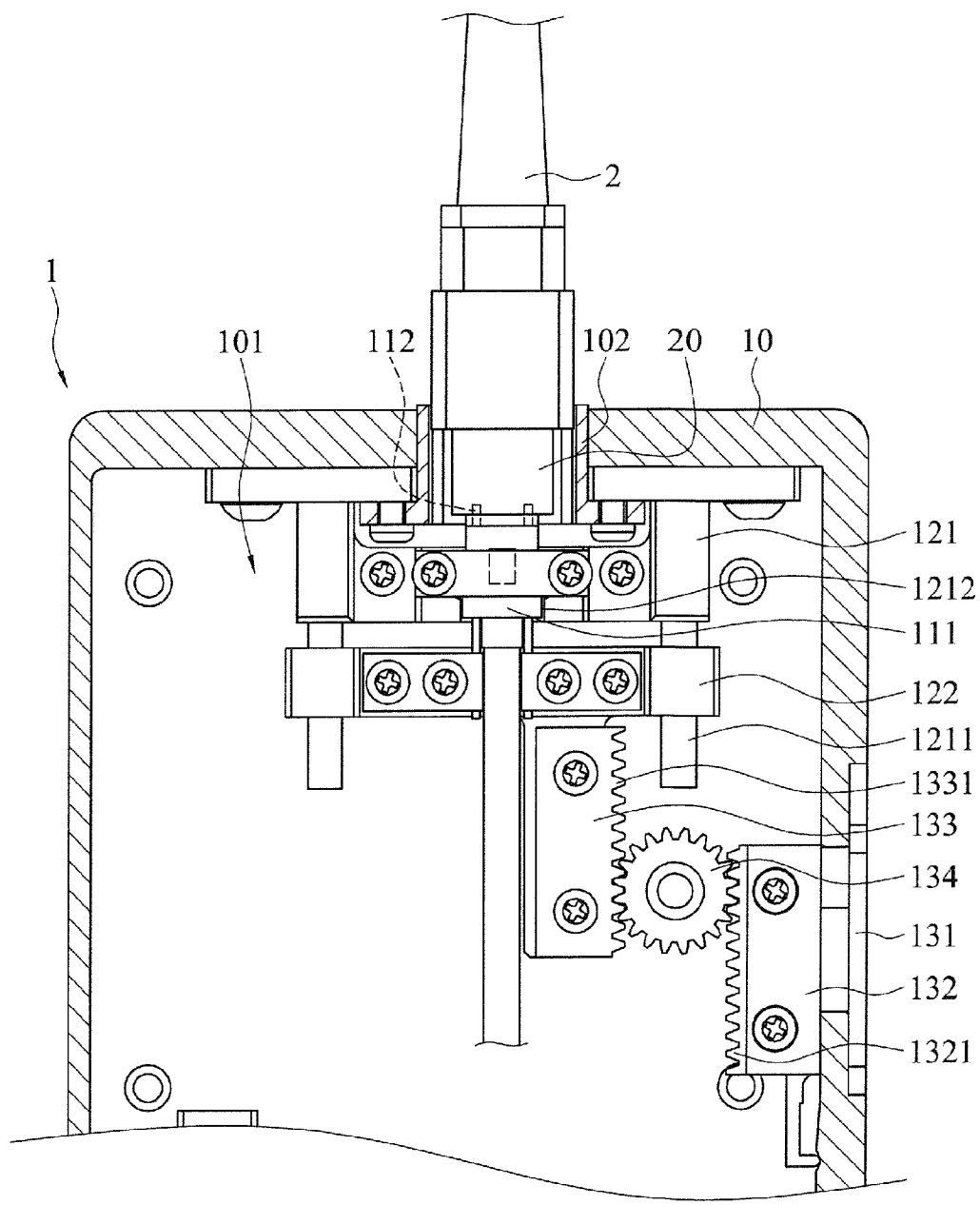
FIG. 5 is a schematic view of a fourth application of a preferred embodiment of the present invention.

Preferably, the pair of moving guide pins 112 are retracted into the pair of through holes 1111 in a normal condition of the fiber optic inspection apparatus 1, but the invention is not limited to such arrangement only. If the connector 20 of the testing fiber optic circuit 2 is the male connector having the protruding pin, the protruding pins of the fiber optic circuit 2 can be plugged into the pair of through holes 1111 and contacted with the pair of moving guide pins 112 for the inspection. On the other hand, if the connector 20 of the testing fiber optic circuit 2 is the female connector having the plug hole as shown in FIG. 3, the control button 131 is pushed in a direction towards the connecting hole 102, while the first guide block 132 is moving simultaneously, and after the gear 134 is rotated, the second engaging portion 1331 drives the second guide block 133. Since the second guide block 133 and the first guide block 132 are disposed opposite to each other, therefore the second guide block 133 will move in an opposite direction and drive the moving seat 122 and the pair of moving guide pins 112, such that the pair of moving guide pins 112 are protruded out from the pair of through holes 1111 to facilitate conducting the pair of moving guide pins 112 with the fiber optic circuit 2 through the plug hole in order to conduct the related inspection. The opposite displacement of the control button 131 drives the first guide block 132 and the second guide block 133 to move in opposite directions, so that the pair of moving guide pins 112 can be received into the pair of through holes 1111.

In the fiber optic inspection apparatus 1 of the present invention, the first control unit 12 and the second control unit 13 are operated and controlled to switch the status of the inspection means 11 to fit the required inspection of the connector 20 of the testing fiber optic circuit 2, so as to achieve the effects of improving the practicality of the fiber optic inspection apparatus 1, avoiding the situation of replacing the inspection apparatus repeatedly for the different types of connectors, and enhancing the inspection efficiency. In addition, the present invention also has the advantage of a simple control and operation, so that users simply push the control button 131 for the mechanical drive to switch the position of the pair of moving guide pins 112 freely, and thus the invention is very convenient for use.

What is claimed is:

1. A fiber optic inspection apparatus, for inspecting a transmission status of a fiber optic circuit, and the fiber optic circuit having at least one connector, which is a male connector with a protruding pin or a female connector with a plug hole, comprising:
    a casing, having an accommodating space, and a connecting hole formed on a side of the casing for plugging in the fiber optic circuit;
    an inspection means, installed in the accommodating space, and having a connecting end and a pair of moving guide pins, and the connecting end being installed at a position corresponding to the connecting hole and coupled to the fiber optic circuit for an inspection, and the connecting end having a pair of through holes corresponding to the pair of moving guide pins respectively for passing the pair of moving guide pins therein, and protruding the pair of moving guide pins out of the pair of through holes or receiving the pair of moving guide pins into the pair of through holes, so that the connecting end can change according to the male connector or the female connector;
    a first control unit, installed in the accommodating space, for fixing the inspection means, and connecting the pair of moving guide pins; and
    at least one second control unit, installed in the accommodating space, and having a control button installed at and extended from a side of the second control unit, and the control button being disposed on an outer side of the casing, and a side of the second control unit opposite to the side having the control button being linked with the first control unit, wherein when a user controls the control button, the second control unit acts correspondingly and drives the first control unit at the same time, so that the pair of moving guide pins are moved and engaged with the fiber optic circuit to conduct an inspection.

2. The fiber optic inspection apparatus of claim 1, wherein the control button is a slider, and the casing has a slide slot formed at a position corresponding to the control button and provided for a user to push and move the control button.

3. The fiber optic inspection apparatus of claim 1, wherein the first control unit includes a fixing seat and a moving seat, and the fixing seat is installed at a position corresponding to the connecting hole for fixing the connecting end, and a pair of protruding columns are extended from a side of the fixing seat, and the moving seat is disposed on a side of the fixing seat and has a pair of penetrating holes for passing the pair of protruding columns, and the moving seat is coupled to the pair of moving guide pins, so that the moving seat drives the pair of moving guide pins while moving along the pair of protruding columns.

4. The fiber optic inspection apparatus of claim 3, wherein the fixing seat has an installation slot concavely formed thereon for fixing the inspection means.

5. The fiber optic inspection apparatus of claim 3, wherein the second control unit includes a first guide block, a second guide block and a gear, and the first guide block is coupled to a side of the control button and has a first engaging portion disposed on an opposite side corresponding to the gear, and the second guide block is coupled to the moving seat and has a second engaging portion disposed on a side corresponding to the gear, and the first guide block and the second guide block are disposed opposite to each other, and the gear is installed between the first guide block and the second guide block and engaged with the first engaging portion and the second engaging portion respectively, and wherein the control button is pushed to drive the first guide block and cause the gear and the second guide block to move, so as to drive the moving seat to move the pair of moving guide pins.

6. The fiber optic inspection apparatus of claim 5, wherein the fixing seat has an installation slot concavely formed thereon for fixing the inspection means.

* * * * *